(12) United States Patent
Mastrocola et al.

(10) Patent No.: US 11,444,507 B2
(45) Date of Patent: Sep. 13, 2022

(54) ACTUATION MOTOR WITH COOLING FINS

(71) Applicant: Hamilton Sundstrand Corporation, Charlotte, NC (US)

(72) Inventors: Naison E. Mastrocola, Goshen, CT (US); Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 314 days.

(21) Appl. No.: 16/593,301

(22) Filed: Oct. 4, 2019

(65) Prior Publication Data

US 2021/0104932 A1 Apr. 8, 2021

(51) Int. Cl.
*H02K 5/18* (2006.01)
*H02K 15/14* (2006.01)
*H02K 9/02* (2006.01)

(52) U.S. Cl.
CPC .............. *H02K 5/18* (2013.01); *H02K 15/14* (2013.01)

(58) Field of Classification Search
CPC ............ H02K 5/18; H02K 15/14; H02K 9/02
USPC ........................................... 310/64, 68 B, 89
See application file for complete search history.

(56) References Cited

U.S. PATENT DOCUMENTS

| | | | | |
|---|---|---|---|---|
| 2008/0098742 A1* | 5/2008 | Sadil | ........................ | F02K 1/12 60/770 |
| 2013/0106252 A1* | 5/2013 | Yanagida | ............. | H02K 11/225 310/68 B |
| 2014/0217844 A1 | 8/2014 | Cocks et al. | | |
| 2016/0294231 A1* | 10/2016 | Andres | ................... | H02K 5/203 |
| 2018/0124953 A1 | 5/2018 | Engelhardt et al. | | |
| 2020/0083783 A1* | 3/2020 | Tangudu | .................. | H02K 9/22 |

FOREIGN PATENT DOCUMENTS

| | | |
|---|---|---|
| CN | 102761180 A | 10/2012 |
| CN | 203368205 U | 12/2013 |
| CN | 203562866 U | 4/2014 |
| CN | 103843231 A | 6/2014 |
| CN | 104734408 A | 6/2015 |
| CN | 204442092 U | 7/2015 |
| CN | 204928444 | * 12/2015 |

(Continued)

OTHER PUBLICATIONS

Extended European Search Report for EP Application No. 19213264.5, dated Jul. 31, 2020, 12 pages.

*Primary Examiner* — Jose A Gonzalez Quinones
(74) *Attorney, Agent, or Firm* — Kinney & Lange, P.A.

(57) ABSTRACT

An electromechanical actuation motor includes a main housing, a series of stator windings, and a first circumferential row of fins. The series of stator windings is disposed inside of the main housing. The first circumferential row of fins is connected to and extends radially from an outer surface of the main housing. The main housing and the first circumferential row of fins are formed as a single piece of material via layer-by-layer additive manufacturing. Each fin of the first circumferential row of fins includes a first portion and a second portion. The first portion is integrally formed with and attached to the outer surface of the main housing at a first end of the first portion. The second portion is attached to and integrally formed with a second end of the first portion. The first portion intersects the second portion to form a T-shape.

16 Claims, 3 Drawing Sheets

(56) References Cited

FOREIGN PATENT DOCUMENTS

| | | | |
|---|---|---|---|
| CN | 107477405 A | * | 12/2017 |
| CN | 107477405 A | | 12/2017 |
| CN | 206775289 U | | 12/2017 |
| CN | 108475967 A | | 8/2018 |
| CN | 108575070 A | | 9/2018 |
| EP | 0048213 A1 | * | 3/1982 ............... H02K 5/18 |
| EP | 3076526 A1 | | 10/2016 |
| JP | 01113562 | * | 6/1989 |
| JP | 2002013467 A | | 1/2002 |

\* cited by examiner

ACTUATION MOTOR WITH COOLING FINS

BACKGROUND

The present disclosure generally relates to electromechanical actuation motors. In particular, the present disclosure relates to cooling fins for electromechanical actuation motors.

Electromechanical actuation motors ("EMAs") used in aircraft engine environments are difficult to cool due to a lack of cooling airflow, high radiation rates of the surrounding 300° C. air, and use of airflow axial and/or perpendicular to the motor making existing fin designs insufficient. In existing engine actuation systems, cooling can be achieved by transferring heat to a fluid powering the actuator. However, in the case of electromechanical actuation, heat transfer to a fluid is often unavailable and cooling can impose a burden in terms of cost, weight, and system complexity. Existing cooling fin designs can prove inadequate in high radiation environments with low airflow velocities.

SUMMARY

An electromechanical actuation motor includes a main housing, a series of stator windings, and a first circumferential row of fins. The series of stator windings is disposed inside of the main housing. The first circumferential row of fins is connected to and extends radially from an outer surface of the main housing. The main housing and the first circumferential row of fins are formed as a single piece of material via layer-by-layer additive manufacturing. Each fin of the first circumferential row of fins includes a first portion and a second portion. The first portion is integrally formed with and attached to the outer surface of the main housing at a first end of the first portion. The second portion is attached to and integrally formed with a second end of the first portion. The first portion intersects the second portion to form a T-shape.

A method of forming a housing of an electromechanical actuation motor includes building a first housing with a layer-by-layer additive manufacturing process. The first housing is built to include an outer surface with a plurality of fins extending radially outward from the outer surface. Each fin includes first and second portions. The first portion is integrally formed with and attached to the outer at a first end of the first portion. The second portion is attached to and is integrally formed with a second end of the first portion. The first portion intersects the second portion such that the first and second portions of each fin form a T shape.

An assembly for actuating a sync ring in an aircraft includes an electromechanical actuation motor and the sync ring. The electromechanical actuation motor is the electromechanical actuation motor is configured to actuate a portion of the sync ring and includes a first housing, a series of stator windings disposed inside of the first housing, and a drive shaft that is rotatably driven by the stator windings. The first housing includes first circumferential row of fins connected to and extending radially from an outer surface of the first housing. The first housing and the first circumferential row of fins are formed as a single piece of material via layer-by-layer additive manufacturing. Each fin of the first circumferential row of fins includes first and second portions. The first portion is integrally formed with and is attached to the outer surface of the first housing at a first end of the first portion. The second portion is attached to and is integrally formed with a second end of the first portion. The first portion is longer than the second portion and intersects the second portion such that the first and second portions of each fin form a T shape. The sync ring is operably connected to the drive shaft of the electromechanical actuation motor.

Figure 1:
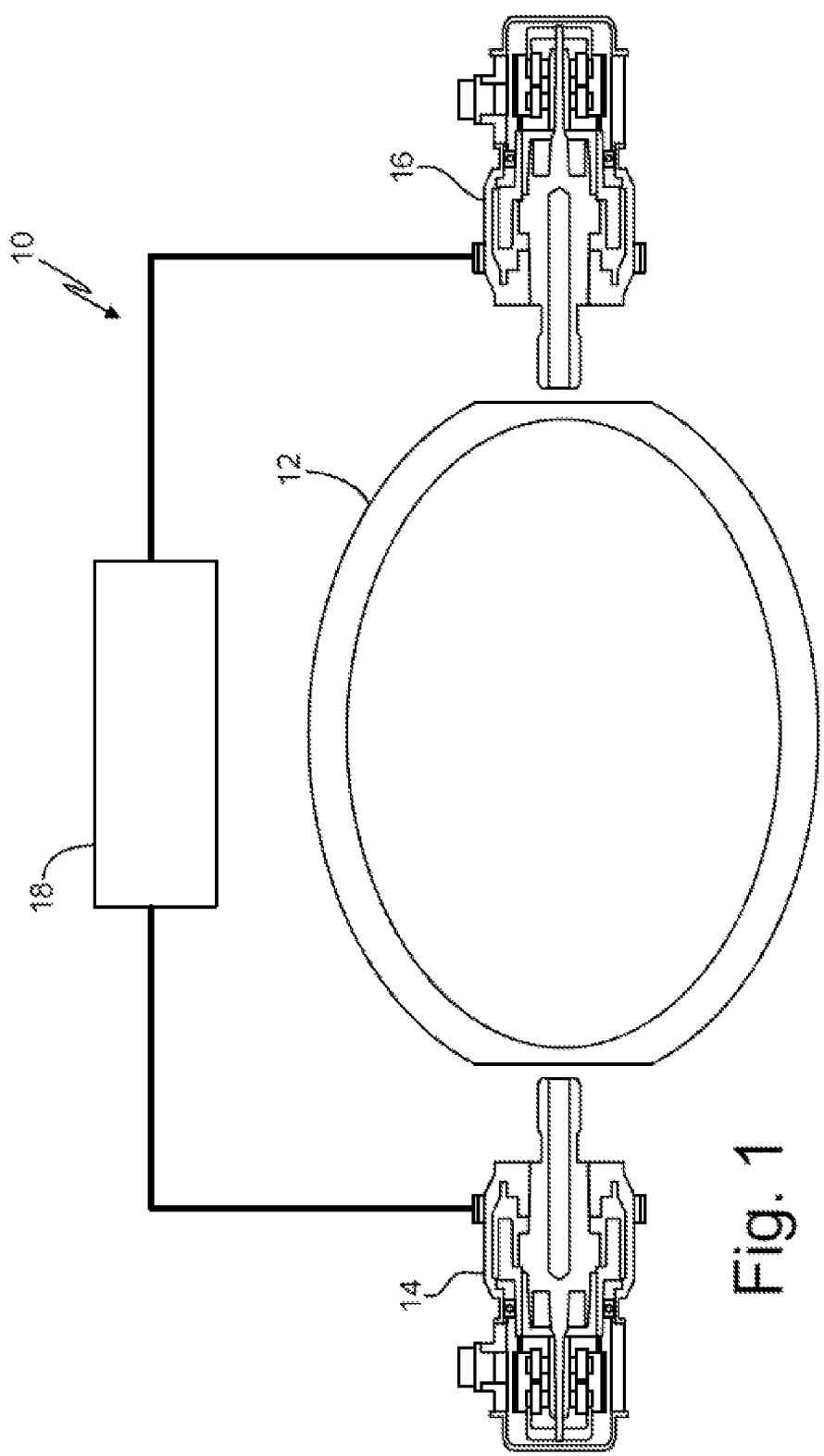
FIG. 1 is a cross-section view of an actuating system and shows a sync ring, a first EMA, and a second EMA.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

This disclosure presents additively manufactured fins with a "T" shape that are additively manufactured with the motor housing. The "T" shape of the fins provides the benefits of guiding airflow next to the body of the EMA while maintaining a laminar boundary layer. The spacing among the "T" fins provides cooling functionality in both parallel and perpendicular orientations, while the top of the "T" fin creates a radiation shield to further manage transfer of thermal energy.

FIG. 1 is a cross-section view of actuating system 10 and shows sync ring 12, first EMA 14, second EMA 16, and controller 18. Actuating system 10 is a system for actuating variable vanes in an aircraft. In this non-limiting embodiment, actuation system includes sync ring 12, first EMA 14, second EMA 16, and controller 18. In other embodiments, additional control components such as sensors, actuators and other subsystems may be utilized with actuating system 10. Sync ring 12 is a generally circular ring with geared elements. First EMA 14 and second EMA 16 are electromechanical actuation motors. Controller 18 is a device for receiving, processing, producing, and sending electrical signals.

In this non-limiting embodiment, actuating system 10 is disposed in an aircraft and is connected to a variable stator vane arrangement. Sync ring 12 is connected to the turbine stator vanes (not shown) of the aircraft. First EMA 14 and second EMA 16 are operably coupled to sync ring 12. For example, geared elements from first EMA 14 and second EMA 16 can be engaged with the geared elements of sync ring 12. First EMA 14 and second EMA 16 are electrically connected to controller 18 via a wired connection. Controller 18 is electrically connected to first EMA 14 and second EMA 16. In one example, controller 18 can be in communication with a full authority digital engine control.

Actuating system 10 controls an angle of the stator vanes based on an amount of desired thrust for the aircraft. Sync ring 12 actuates in response to torque received by first EMA 14 and second EMA 16. The torque received by first EMA 14 and second EMA 16 is then transferred by sync ring 12 to the stator vanes so as to change an angle of the stator vanes. First EMA 14 and second EMA 16 drive actuation of sync ring 12 in response to communications received from controller 18. Controller 18 sends and receives electrical signals from first EMA 14 and second EMA 16 in order to control operation of first EMA 14 and second EMA 16.

Figure 2:
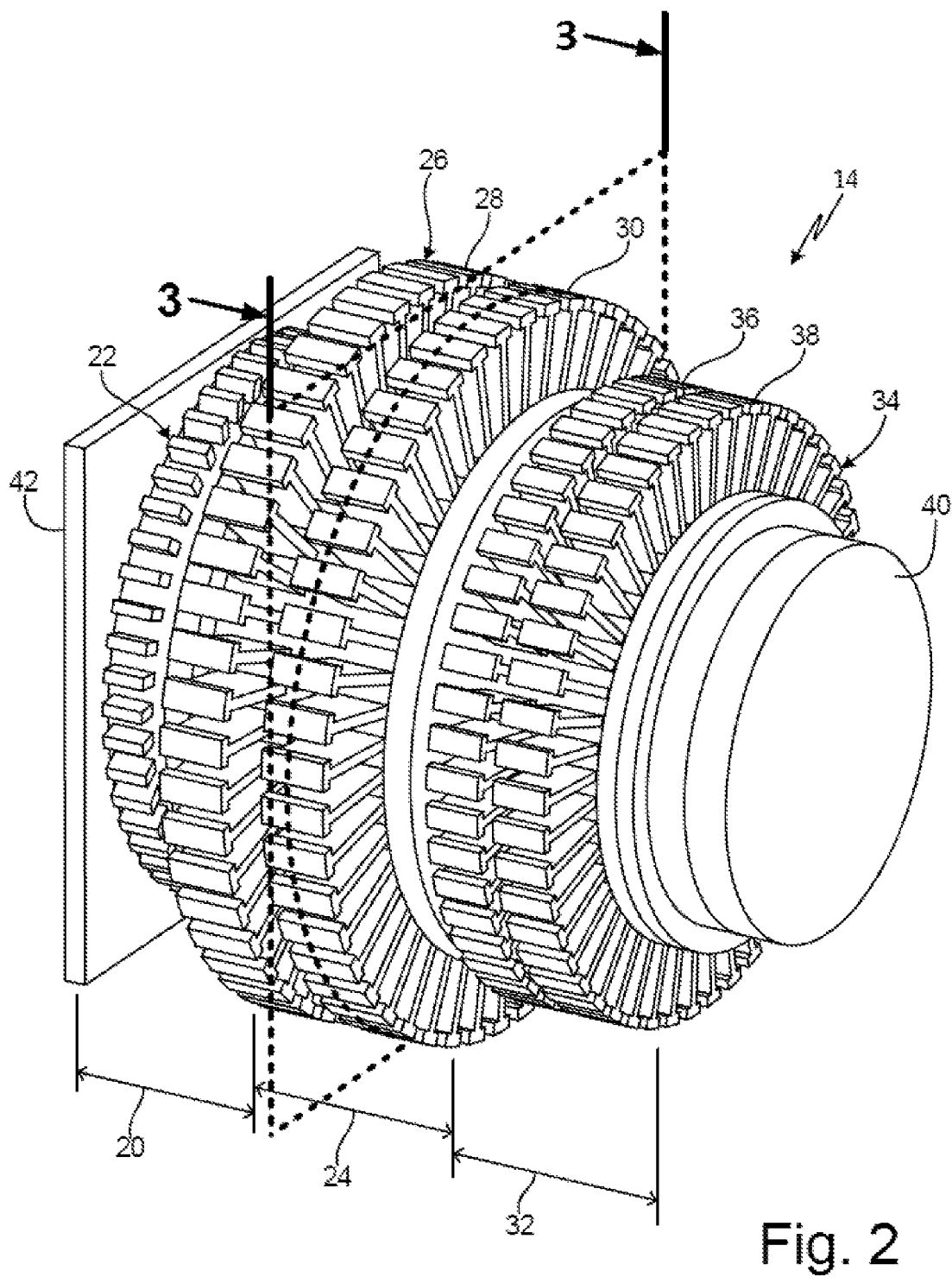
FIG. 2 is a perspective view of the first EMA and shows a motor housing with "T" shaped fins.

FIG. 2 is a perspective view of first EMA 14 and shows first housing portion 20 (with first fin set 22), second housing portion 24 (with second fin set 26 that includes second proximal row 28 and second distal row 30), third housing portion 32 (with third fin set 34 that includes third proximal row 36 and third distal row 38), endcap 40, and panel 42.

First housing portion 20, second housing portion 24, and third housing portion 32 are axial portions of a housing of first EMA 14. First fin set 22, second fin set 26, and third fin set 34 are sets of cooling fins. In this non-limiting embodiment, the fins of second fin set 26 and third fin set 34 include a T-shape. In another non-limiting embodiment, the fins of first fin set 22 can also include a T-shape. Second proximal row 28, second distal row 30, third proximal row 36, and third distal row 38 are axially spaced rows of cooling fins. Endcap 40 is a lid or cover. Panel 42 is a planar piece of solid material that is an internal a surface of the aircraft. In one non-limiting embodiment, panel 42 can be a surface of a gear box of the aircraft.

First housing portion 20 is axially adjacent to and integrally formed with second housing portion 24. First fin set 22 is integrally formed with and located on first housing portion 20. The fins of first fin set 22 are integrally grown with first housing portion 20 via layer-by-layer additive manufacturing. First fin set 22 extends circumferentially around first housing portion 20. In this non-limiting embodiment, the fins of first fin set 22 are uniformly spaced in a circumferential direction with respect to first housing portion 20. The fins of first fin set 22 include a rectangular polygon shape. In another example, the fins of first fin set 22 can include a T-shape cross-section configuration as is shown by the fins of second and third fin sets 26 and 34.

Second housing portion 24 is axially adjacent to and integrally formed with first housing portion 20 and third housing portion 32. Second fin set 26 is integrally formed with and located on second housing portion 24. The fins of second fins set 26 are integrally grown with second housing portion 24 via layer-by-layer additive manufacturing. Second fin set 26 extends circumferentially around second housing portion 24. Second proximal row 28 is disposed on second housing portion 24 in a position that is axially closer to panel 42 than second distal row 36. Second distal row 30 is disposed on second housing portion 24 in a position that is axially further from panel 42 than second proximal row 28.

Third housing portion 32 is axially adjacent to and integrally formed with second housing portion 24. Third fin set 34 is integrally formed with and located on third housing portion 32. The fins of third fin set 34 are integrally formed with third housing portion 32 via layer-by-layer additive manufacturing. Third fin set 34 extends circumferentially around third housing portion 32. Third proximal row 36 is disposed on third housing portion 32 in a position that is axially closer to panel 42 than third distal row 38. Third distal row 38 is disposed on third housing portion 32 in a position that is axially further from panel 42 than third proximal row 36. Endcap 40 is attached or mounted onto an end of third housing portion 32 opposite from second housing portion 24. Panel 42 is attached or mounted to an end of first housing portion 20.

First housing portion 20 connects second housing portion 24 to panel 42. As will be discussed with respect to FIG. 3, first fin set 22, second fin set 26, and third fin set 32 of fins increases a surface area of first, second, and third housing portions 20, 24, and 32 so as to increase a rate of transfer of thermal energy from the fins of first fin set 22, second fin set 26, and third fin set 32 to a flow of air passing across the fins of first fin set 22, second fin set 26, and third fin set 32. First fin set 22, second fin set 26, and third fin set 32 of fins also block and reduce the radiation impact of thermal energy from components surrounding first EMA 14 in the aircraft.

Second housing portion 24 provides structural support for first EMA 14 and connects third housing portion 32 with first housing portion 20. In this non-limiting embodiment, second housing portion 24 houses and contains a permanent motor. Third housing portion 32 provides structural support for third fin set 32 of fins. In this non-limiting embodiment, third housing portion 24 houses and contains a resolver (e.g., rotary electrical transformer). Endcap 40 surrounds a distal end of first EMA 14. Panel 42 acts as a mounting surface to which first housing portion 20 of first EMA 14 is mounted to.

Figure 3:
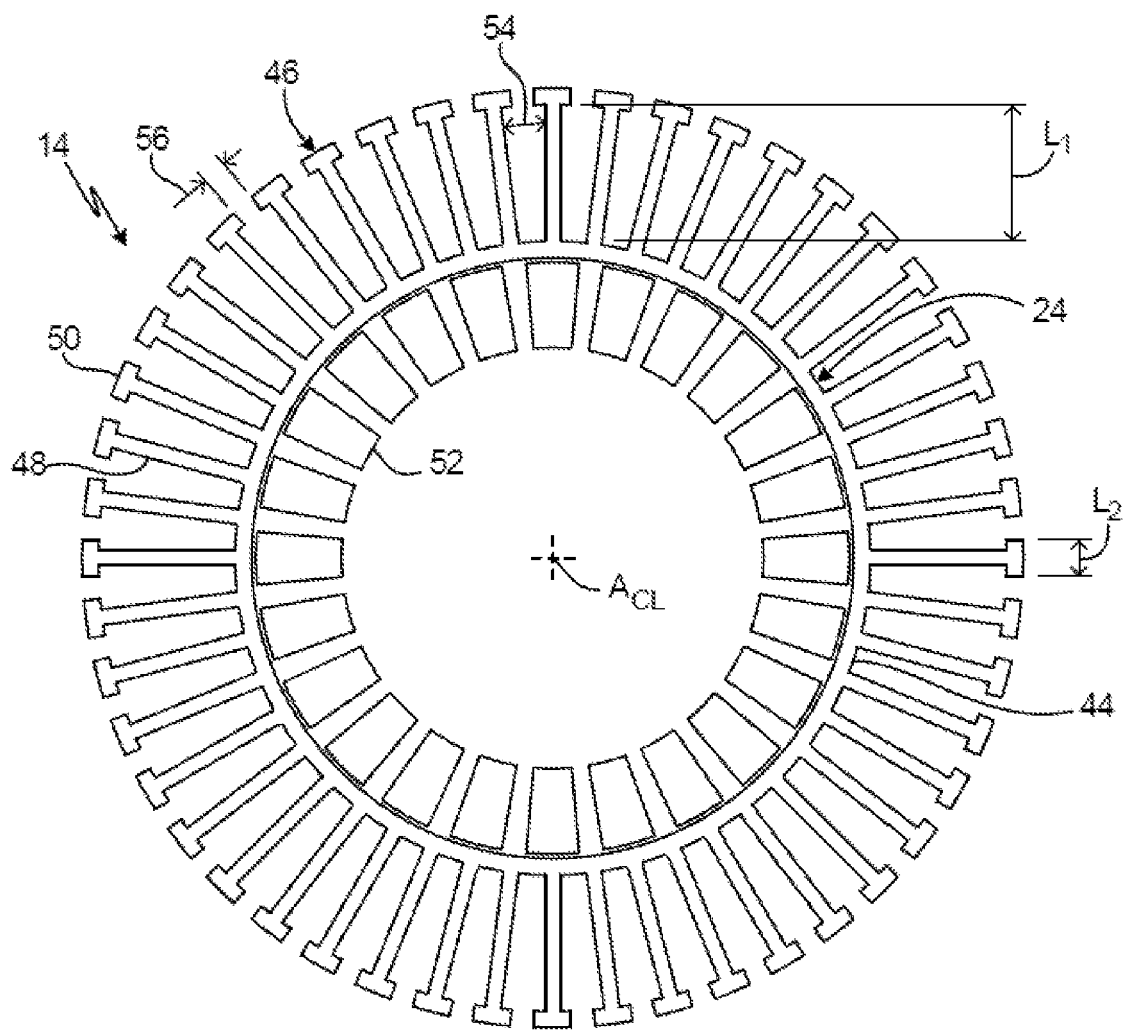
FIG. 3 is a cross-section view of the first EMA and shows the motor housing, the "T" shaped fins, and the stator windings of the EMA.

FIG. 3 is a cross-section view of first EMA 14 taken along the plane 3-3 from FIG. 2 and shows second housing portion 24 (with outer surface 44), second distal row 30 of fins 46 each with first portion 48 (including length $L_1$) and second portion 50 (including length $L_2$), stator windings 52, channels 54, gaps 56, and axial centerline $A_{CL}$. The description herein of second housing portion 24 and fins 46 can also be generalized to describe first and third housing portions 20 and 32 and their respective fins.

Outer surface 44 is a radially exterior surface of second housing portion 24. Fins 46 are radially extending pieces of solid material. Fins 46 are built with layer-by-layer additive manufacturing along with second housing portion 24 and such that fins 46 and second housing portion 24 are a single piece of solid material. In this non-limiting embodiment, fins 46 (and second housing portion 24) are built with a laser sintering or powder bed fusion type of additive manufacturing. A material of fins 46 and second housing portion 24 can include a metal such as aluminum. In one non-limiting embodiment, a quantity of fins 46 can be from 24 to 96. In this non-limiting embodiment, first portion 48 and second portion 50 are elongate rectangles of solid material. In other embodiments, first portion 48 and/or second portion 50 can include a degree of curvature or other non-linear shapes.

Length $L_1$ is a length of first portion 48 taken along a radial direction of second housing portion 24 relative to axial centerline $A_{CL}$. In this example, length $L_1$ can range from 0.5 inches to 2 inches (e.g., 1.27 centimeters to 5.08 centimeters). Length $L_2$ is a length of second portion 50 taken along the direction shown in FIG. 3, which is in a direction perpendicular to the radial direction of second housing portion 24. In this example, length $L_2$ can range from 0.1 inches to 0.5 inches (e.g., 0.25 centimeters to 1.27 centimeters). In one non-limiting embodiment, a ratio of length $L_1$ to length $L_2$ can be approximately 4:1. Also in this example, a thickness or first portion 48 and/or second portions 50 can range from 0.05 inches to 0.2 inches (e.g., 0.13 centimeters to 0.51 centimeters). Stator windings 52 are stator windings of a permanent motor. Channels 54 are spaces or passages formed between adjacent first portions 48. Gaps 56 are spaces or channels formed between adjacent second portions 50. Axial centerline $A_{CL}$ is a centerline axis of second housing portion 24 and of first EMA 14.

Outer surface 44 extends circumferentially around second housing portion 24. Fins 46 are formed with and extend radially outward from outer surface 44 of second housing portion 24. In this example, fins 46 are situated around second housing portion 24 with uniform spacing between fins 46. In other examples, the spacing between fins can be non-uniform or variable around the circumference of second housing portion 24. Also in this example, lengths $L_1$ and $L_2$ are shown as uniform across all fins 46. In other examples, lengths $L_1$ and $L_2$ can be non-uniform or variable around the circumference of second housing portion 24.

First portion 48 is directly connected to outer surface. In this non-limiting embodiment, first portion 48 of each of fins 46 extends in a radial direction relative to axial centerline $A_{CL}$ of second housing portion 24. First portion 48 is connected to second portion 50 at a mid-point of second portion 50. In this non-limiting embodiment, second portion 50 is perpendicular to first portion 48. In other examples, second portion 50 can be set at a non-perpendicular angle (e.g., a non-90° angle) to first portion 48. In yet another example, first portion 48 can connected to second portion 50 at a point of second portion 50 that is not a mid-point of second portion 50. Each first portion 48 forms one of channels 54 with an adjacent first portion 48.

Second portion 50 is integrally formed with and to a distal end of first portion 48. Each second portion 50 forms a gap between an adjacent second portion 50. Stator windings 52 are positioned inside of second housing portion 24 in a circular arrangement. Axial centerline $A_{CL}$ passes through a mid-point of second housing portion 24 (and of first and third housing portions 20 and 32). In this non-limiting embodiment, a build direction of the layer-by-layer additive manufacturing process of second housing portion 24 with fins 46 is into or out of the page (e.g., parallel to axial centerline $A_{CL}$) as shown in FIG. 3. In such an example, because first and third housing portions 20 and 32 are integrally formed with second housing portion 24, a build direction of first and third housing portions 20 and 32 is also is into or out of the page as shown in FIG. 3.

Fins 46 provide additional surface area to second housing portion 24 across which a flow of cooling air passes and comes into contact thereby increasing a transfer rate of thermal energy from second housing portion 24 to the flow of cooling air. First portions 48 provide structural support for second portions 50. First portions 48 also form lateral boundaries of channels 54 that contain and channel the flow of cooling air through channels 54. Second portions 50, in combination with first portions 48, trap and confine airflow in channels 54 between adjacent first portions 48 and radially inward from second portions 50. Second portions 50 also acts as a heat shield by blocking heat radiated from other aircraft components from reaching second housing portion 24.

Stator windings 52 create a magnetic field to generate force in the form of rotation of a rotary element of first EMA 14. Channels 54 provide passages through which cooling airflow can travel and be in contact with outer surface 44 of second housing portion 24, with first portions 48, and with second portions 50 so as to transfer thermal energy to the passing cooling air. Gaps 56 allow air to flow into channels 54. While some of the cooling airflow may dissipate out and through gaps 56, second portions 50 contain a large portion of the flow of cooling air passing through channels 54.

In one example, first EMA 14 can be positioned in an environment such that a direction of cooling airflow is perpendicular to axial centerline $A_{CL}$. In such an example, gaps 56 allow cooling airflow to enter into channels 54 with second portions 50 trapping a majority of the airflow in channels 54. Second portions 50 also shield and deflect direct impingement of thermal energy onto second housing portion 24. In another example, first EMA 14 can be positioned in an environment such that a direction of cooling airflow is parallel to axial centerline $A_{CL}$. In such an example, cooling airflow can flow directly into channels 54 between fins 46.

The T-shape of fins 46 acts to guide cooling airflow next to the body of first EMA 14 while also maintain a laminar boundary layer of airflow. With the T-shape of fins 46, spacing among fins 46 enables fluid management capabilities in both parallel and perpendicular orientations to a direction of cooling airflow. Additionally, second portions 50 of fins 46 (e.g., the top of the T) creates a radiation shield which blocks impinging radiating heat from components in the vicinity of first EMA 14.

Discussion of Possible Embodiments

An electromechanical actuation motor includes a main housing, a series of stator windings, and a first circumferential row of fins. The series of stator windings is disposed inside of the main housing. The first circumferential row of fins is connected to and extends radially from an outer surface of the main housing. The main housing and the first circumferential row of fins are formed as a single piece of material via layer-by-layer additive manufacturing. Each fin of the first circumferential row of fins includes a first portion and a second portion. The first portion is integrally formed with and attached to the outer surface of the main housing at a first end of the first portion. The second portion is attached to and integrally formed with a second end of the first portion. The first portion intersects the second portion to form a T-shape.

The electromechanical actuation motor of the preceding paragraph can optionally include, additionally and/or alternatively, any one or more of the following features, configurations and/or additional components.

The first portion can be longer than the second portion.

The first and second portions of each fin can be linear.

A ratio of the length of the first portion to a length of the second portion can be approximately 4:1.

A second housing can extend axially from and/or be integrally formed with the first housing, wherein the second housing can be co-axial with the first housing; and/or a resolver disposed inside of the second housing.

A second circumferential row of fins can be connected to and/or extend radially from the second housing.

A drive shaft can extend axially from the first housing along the centerline axis.

The first portion can extend radially outward from the first end of the first portion to the second end of the first portion, and/or the second portion can extends perpendicularly from the second end of the first portion.

The second portions of the row of fins can form an interrupted cylinder with gaps formed between circumferentially adjacent second portions.

A method of forming a housing of an electromechanical actuation motor includes building a first housing with a layer-by-layer additive manufacturing process. The first housing is built to include an outer surface with a plurality of fins extending radially outward from the outer surface. Each fin includes first and second portions. The first portion is integrally formed with and attached to the outer at a first end of the first portion. The second portion is attached to and is integrally formed with a second end of the first portion. The first portion intersects the second portion such that the first and second portions of each fin form a T shape.

The method of the preceding paragraph can optionally include, additionally and/or alternatively, any one or more of the following features, configurations, steps and/or additional components.

A build direction of the layer-by-layer additive manufacturing process can be in an axial direction of the housing.

Each fin can be formed such that the first and second portions of each fin can be linear.

Each fin can be formed such that a ratio of the length of the first portion to a length of the second portion can be approximately 4:1.

A second housing can be formed to extend axially from and/or integrally formed with the first housing, wherein the second housing can be co-axial with the first housing.

A second circumferential row of fins can be formed to connect to and/or extend radially from the second housing.

The first portion can extend radially outward from the first end of the first portion to the second end of the first portion, and/or the second portion can extend perpendicularly from the second end of the first portion.

The second portions of the row of fins can form an interrupted cylinder with gaps formed between circumferentially adjacent second portions.

An assembly for actuating a sync ring in an aircraft includes an electromechanical actuation motor and the sync ring. The electromechanical actuation motor is the electromechanical actuation motor is configured to actuate a portion of the sync ring and includes a first housing, a series of stator windings disposed inside of the first housing, and a drive shaft that is rotatably driven by the stator windings. The first housing includes first circumferential row of fins connected to and extending radially from an outer surface of the first housing. The first housing and the first circumferential row of fins are formed as a single piece of material via layer-by-layer additive manufacturing. Each fin of the first circumferential row of fins includes first and second portions. The first portion is integrally formed with and is attached to the outer surface of the first housing at a first end of the first portion. The second portion is attached to and is integrally formed with a second end of the first portion. The first portion is longer than the second portion and intersects the second portion such that the first and second portions of each fin form a T shape. The sync ring is operably connected to the drive shaft of the electromechanical actuation motor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electromechanical actuation motor comprising:
   a first housing defining an outer surface having a plurality of fins extending radially from the outer surface, wherein the first housing and the plurality of fins are formed as a single piece of material via layer-by-layer additive manufacturing, wherein each fin of the plurality of fins comprises:
   a first portion integrally formed with and attached to the outer surface at a first end of the first portion; and
   a second portion attached to and integrally formed with a second end of the first portion, and wherein the first portion intersects the second portion such that the first and second portions of each fin form a T shape; and
   a plurality of stator windings disposed inside of the first housing wherein:
   the second portions of the plurality of fins are spaced to form a heat shield that blocks radiant heat from reaching the first housing; and
   a ratio of the length of the first portion to a length of the second portion is approximately 4:1.

2. The electromechanical actuation motor of claim 1, wherein the first portion is longer than the second portion.

3. The electromechanical actuation motor of claim 1, wherein the first and second portions of each fin are linear.

4. The electromechanical actuation motor of claim 1, further comprising:
   a second housing extending axially from and integrally formed with the first housing, wherein the second housing is co-axial with the first housing; and
   a resolver disposed inside of the second housing.

5. The electromechanical actuation motor of claim 1, further comprising a second circumferential row of fins connected to and extending radially from the second housing.

6. The electromechanical actuation motor of claim 1, further comprising a drive shaft extending axially from the first housing along the centerline axis.

7. The electromechanical actuation motor of claim 1, wherein the first portion extends radially outward from the first end of the first portion to the second end of the first portion, and wherein the second portion extends perpendicularly from the second end of the first portion.

8. The electromechanical actuation motor of claim 1, wherein the second portions of the row of fins form an interrupted cylinder with gaps formed between circumferentially adjacent second portions.

9. A method of forming a housing of an electromechanical actuation motor, the method comprising:
   building, with a layer-by-layer additive manufacturing process, a first housing having an outer surface with a plurality of fins extending radially outward from the outer surface, wherein each fin comprises:
   a first portion integrally formed with and attached to the outer at a first end of the first portion; and
   a second portion attached to and integrally formed with a second end of the first portion, wherein the first portion intersects the second portion such that the first and second portions of each fin form a T shape;
   wherein:
   the second portions of the plurality of fins are spaced to form a heat shield that blocks radiant heat from reaching the first housing; and
   a ratio of the length of the first portion to a length of the second portion is approximately 4:1.

10. The method of claim 9, wherein a build direction of the layer-by-layer additive manufacturing process is in an axial direction of the housing.

11. The method of claim 9, further comprising forming each fin such that the first and second portions of each fin are linear.

12. The method of claim 9, further comprising forming a second housing extending axially from and integrally formed with the first housing, wherein the second housing is co-axial with the first housing.

13. The method of claim 12, further comprising forming a second circumferential row of fins connected to and extending radially from the second housing.

14. The method of claim 9, wherein the first portion extends radially outward from the first end of the first portion to the second end of the first portion, and wherein the second portion extends perpendicularly from the second end of the first portion.

15. The method of claim 9, wherein the second portions of the row of fins form an interrupted cylinder with gaps formed between circumferentially adjacent second portions.

16. An assembly for actuating a sync ring in an aircraft, the assembly comprising:
- an electromechanical actuation motor comprising:
  - a first housing with a centerline axis passing through a center of the first housing, wherein the first housing comprises:
    - a first circumferential row of fins connected to and extending radially from an outer surface of the first housing, wherein the first housing and the first circumferential row of fins are formed as a single piece of material via layer-by-layer additive manufacturing, wherein each fin of the first circumferential row of fins comprises:
      - a first portion integrally formed with and attached to the outer surface of the first housing at a first end of the first portion; and
      - a second portion attached to and integrally formed with a second end of the first portion, wherein the first portion is longer than the second portion, wherein the first portion intersects the second portion such that the first and second portions of each fin form a T shape;
  - a series of stator windings disposed inside of the first housing;
  - a drive shaft that is rotatably driven by the stator windings; and
- the sync ring operably connected to the drive shaft of the electromechanical actuation motor, wherein the electromechanical actuation motor is configured to actuate a portion of the sync ring;

wherein:
- the second portions of the plurality of fins are spaced to form a heat shield that blocks radiant heat from reaching the first housing; and
- a ratio of the length of the first portion to a length of the second portion is approximately 4:1.

* * * * *